United States Patent [19]
Beeman et al.

[11] Patent Number: 5,654,809
[45] Date of Patent: Aug. 5, 1997

[54] METHOD AND APPARATUS FOR DYNAMIC WHITE POINT ADJUSTMENT

[75] Inventors: Edward S. Beeman, Windsor; Steven L. Webb, Loveland; Michael J. Steinle, Ft. Collins; Robert G. Gann, Bellvue; Brian L. Hastings; Greg A. Degi, both of Ft. Collins, all of Colo.

[73] Assignee: Hewlett-Packard Co., Palo Alto, Calif.

[21] Appl. No.: 594,192

[22] Filed: Jan. 31, 1996

[51] Int. Cl.$^6$ .................................. H04N 1/04; H04N 1/48
[52] U.S. Cl. ..................... 358/504; 358/509; 358/516
[58] Field of Search ................................ 358/516, 504, 358/509, 446, 475, 513, 514, 481, 482; 348/223, 229, 230; 250/214 AG, 208.1

[56] References Cited

U.S. PATENT DOCUMENTS

| | | | |
|---|---|---|---|
| 4,803,556 | 2/1989 | Beikirch | 358/475 |
| 5,278,674 | 1/1994 | Webb et al. | 358/475 |
| 5,285,293 | 2/1994 | Webb et al. | 358/471 |
| 5,336,976 | 8/1994 | Webb et al. | 315/134 |
| 5,504,524 | 4/1996 | Lu et al. | 348/223 |

*Primary Examiner*—Scott A. Rogers
*Attorney, Agent, or Firm*—Cynthia S. Baan

[57] ABSTRACT

A method for dynamically determining and adjusting the color balance of the light strip along one edge of the scanned area and adjusting the gains of independently controlled red, green and blue channels of a CCD array. Alternatively, the gain of one color channel may be held constant and measured to determine the light intensity of the light source as the temperature of the light source varies. The power to the light is then changed to maintain the intensity of the light source within a predetermined range. The three color channels are then compared to a predetermined color balance. If the color balance is outside of a predetermined range, the other two color channels gains are varied in order to maintain the color balance between the three color channels.

11 Claims, 6 Drawing Sheets

METHOD AND APPARATUS FOR DYNAMIC WHITE POINT ADJUSTMENT

FIELD OF THE INVENTION

The present invention relates generally to the field of document scanning and more particularly to a method and apparatus that detects and compensates for color balance variation during the scanning process.

BACKGROUND OF THE INVENTION

A document scanner is a device which converts a visible image such as a photograph, transparency or printed paper into an electronic form suitable for copying, storing or processing by a computer. Document scanners typically have a controlled source of light which is reflected off the surface of a document or is transmitted through a transparent document onto an array of photosensitive devices. The photosensitive devices convert received light intensity into an electronic signal. In some configurations, the light source is a long tube providing a narrow band of light which extends to each edge of one dimension of the document or beyond the edges.

For electric discharge lamps such as fluorescent bulbs, the color balance of the light varies depending on the temperature of the bulb. When such a light source is first powered on, color balance of the light varies dynamically along the length of the bulb until the overall temperature of the light source stabilizes. Moreover, during long scans, the temperature of the bulb can change enough to cause an unsatisfactory shift in the bulb color balance causing a color shift in the image scanned.

One solution to this problem is to leave the bulb on continuously, which allows the bulb temperature to reach a steady state. This solution is a costly solution due to frequent changing of the light source and continual power usage.

Thus, the need exists for a scanner method and apparatus that will compensate for color variances of the light source as a function of temperature in a dynamic manner, for example during each and every document scan, to thereby allow document scanning to begin within a second or two after the light source has been initially energized.

SUMMARY OF THE INVENTION

In the document scanner incorporating the present invention, the color shift of the light source is dynamically compensated for by monitoring a strip of known reflectance along the side of the scanned area and adjusting the gains of independently controlled red, green and blue channels of a CCD array. This method permits dynamic compensation as each scan line is processed or at each stop/start location just before the next scan line begins. Such a solution maintains the correct color of the image being scanned at the beginning of the scanning process and over long scan times.

BRIEF DESCRIPTION OF THE DRAWINGS

The above and other objects, features and advantages of the present invention will be better understood by reading the following more particular description of the invention, presented in conjunction with the following drawings, wherein.

DETAILED DESCRIPTION OF THE PREFERRED EMBODIMENT

Figure 1:
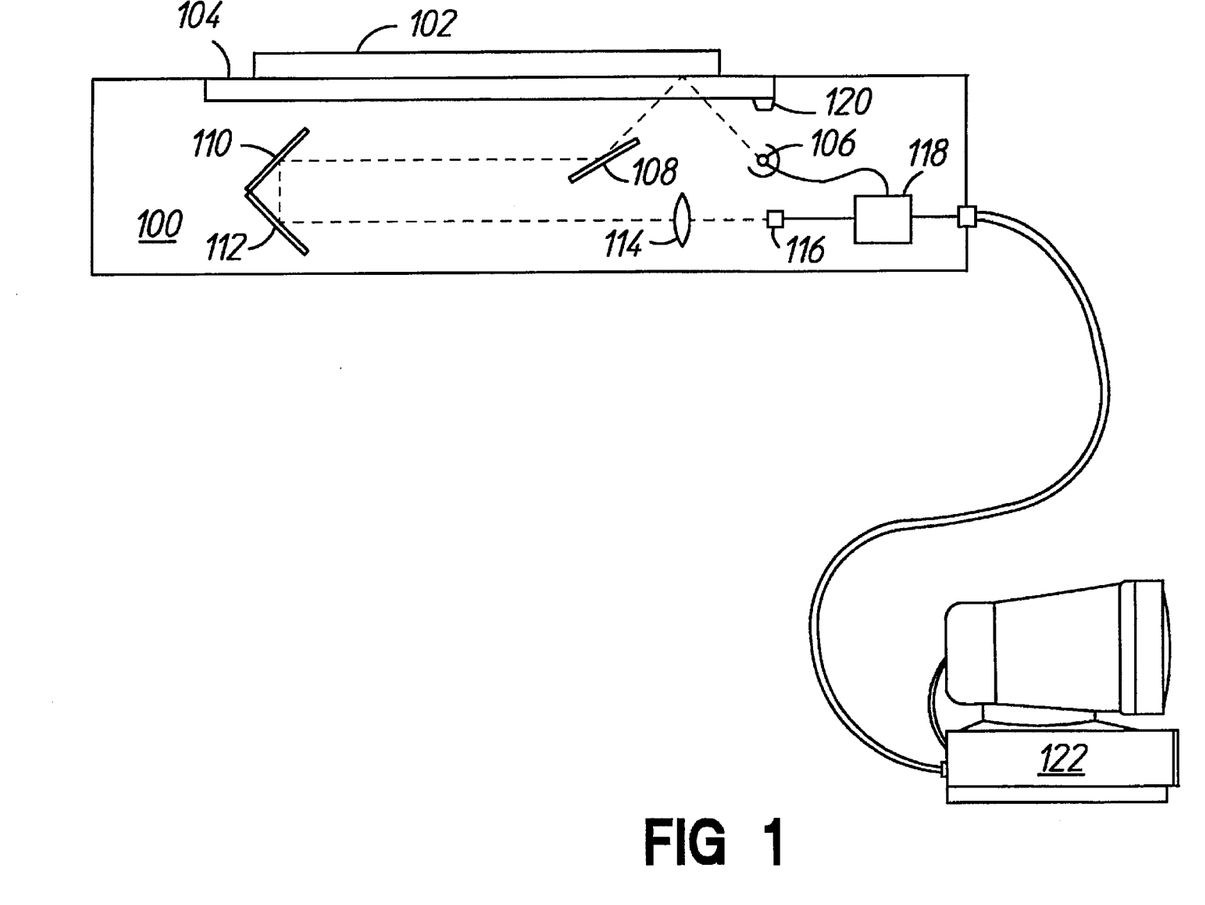
FIG. 1 shows a side view block diagram of a document scanner.

FIG. 1 is a block diagram illustration of a side view of a document scanner. Document scanner 100 has an opaque document 102 lying face down on a transparent platen 104. A lamp 106 projects a narrow line of light onto the face of document 102 which reflects onto mirrors 108, 110 and 112, through a focusing lens 114 onto photodetector array 116. In the configuration illustrated in FIG. 1, the lamp moves to provide a moving line of light along the stationary document 102 for detection by the photodetector array 116. In other configurations, the document may move past a stationary light source. Photodetector array 116 converts light into an electrical signal for a controller 118 which among other things controls the power going to lamp 116 before scanning the document 102. Controller 118 sends image data to a printer (not illustrated) for copying or to a computer 122. Controller 118 also receives control commands from computer 122.

Figure 2:
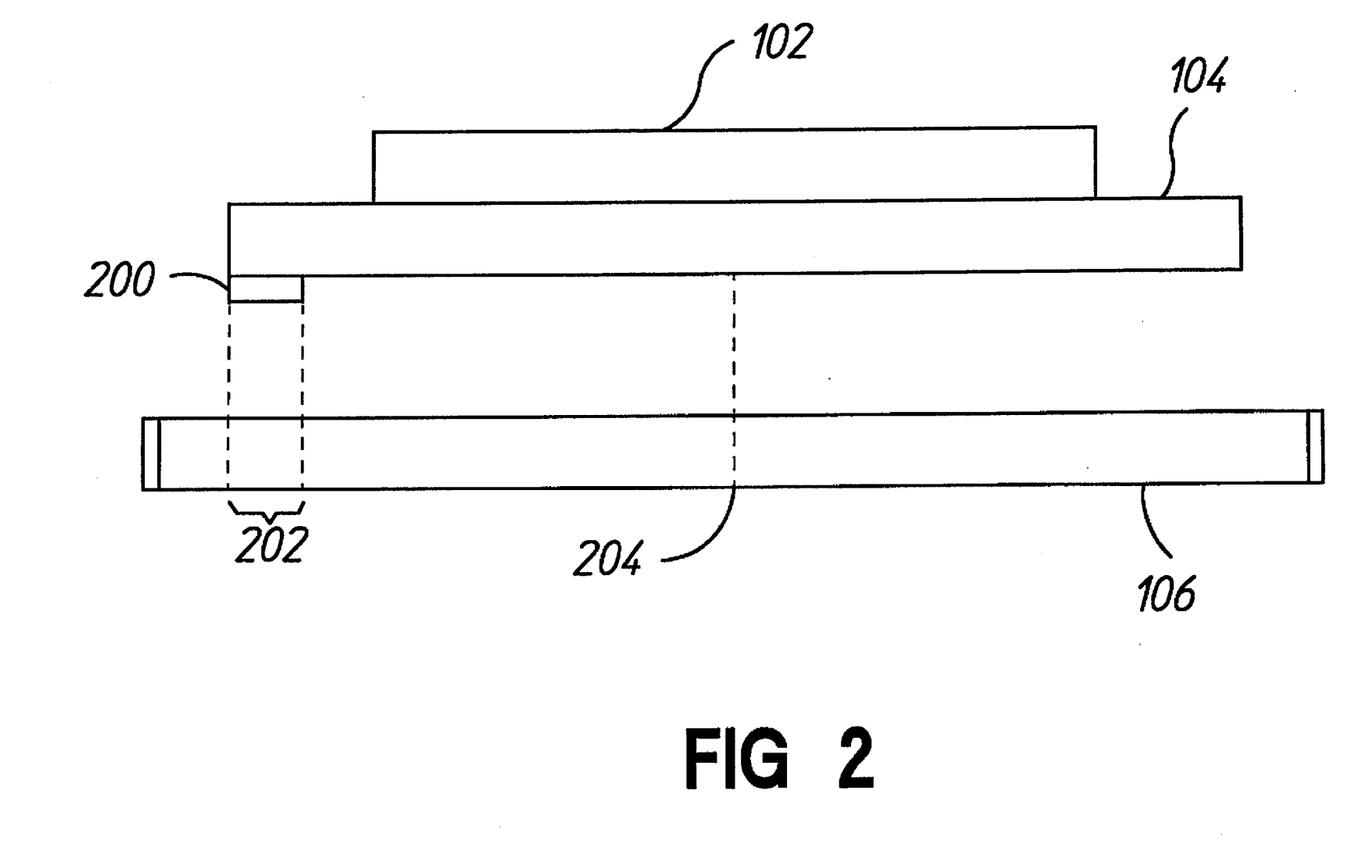
FIG. 2 shows a front view block diagram of a document scanner.

FIG. 2 is a block diagram front view of some of the components of the document scanner 100. As in FIG. 1, the document 102 is lying face down on the transparent platen 104. The face of the document 102 is illuminated by the lamp 106. As illustrated in FIG. 2, the lamp 106 is a long tube extending beyond the edges of the document 102. A lamp calibration target 200 is used to calibrate the color balance of the light from the lamp 106. The lamp calibration target 200 may be a small reflective area just at one end of the platen 104 for continuous closed loop control during a scan or it may extend along the entire length of the platen 104 for initial calibration. Light from a relatively small calibration area 202 near the end of the lamp 106 is reflected from the lamp calibration target 200 onto the photosensor array 116 (FIG. 1).

Figure 3:
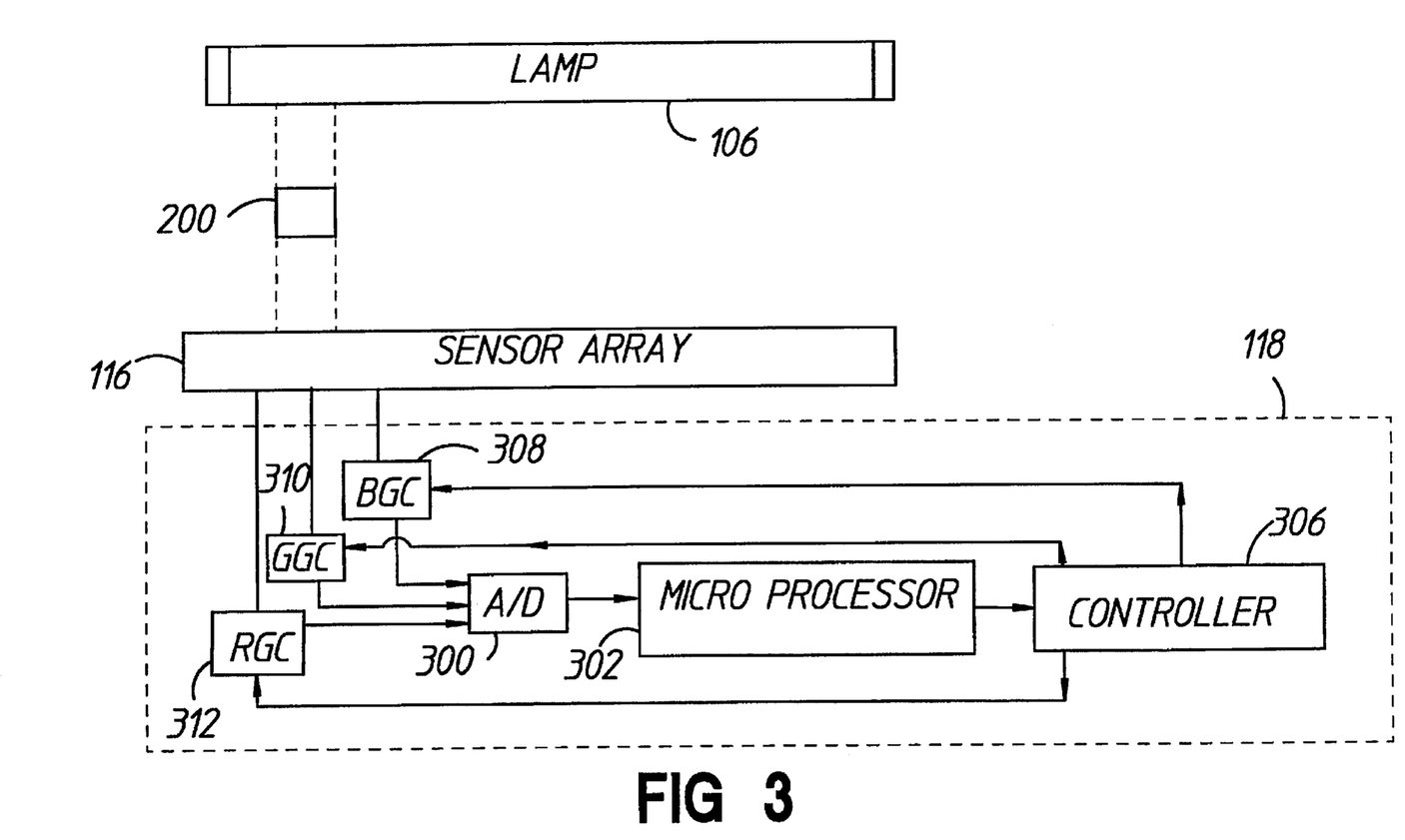
FIG. 3 shows a block diagram schematic of gain control circuitry of the present invention.

FIG. 3 is a block diagram of the closed loop lamp color balance control circuitry. As illustrated in FIGS. 1 and 2, light from the lamp 106 is reflected from the calibration target 200 onto a portion of the sensor array 116. Analog signals from elements of the sensor array 116 which are illuminated by target 200 are converted to digital information by an analog to digital converter (A/D) 300. The digital information is processed by a microprocessor 302 which compares the red, green and blue components to predetermined values that the red, green and blue components should have for the calibration target. If any of the red, green or blue components deviate from the predetermined values by more than a predetermined amount, the respective red, green or blue channels of the sensor array will be adjusted by controller 306 and the respective red gain controller 312, green gain controller 310 or blue gain controller 308.

Figure 4:
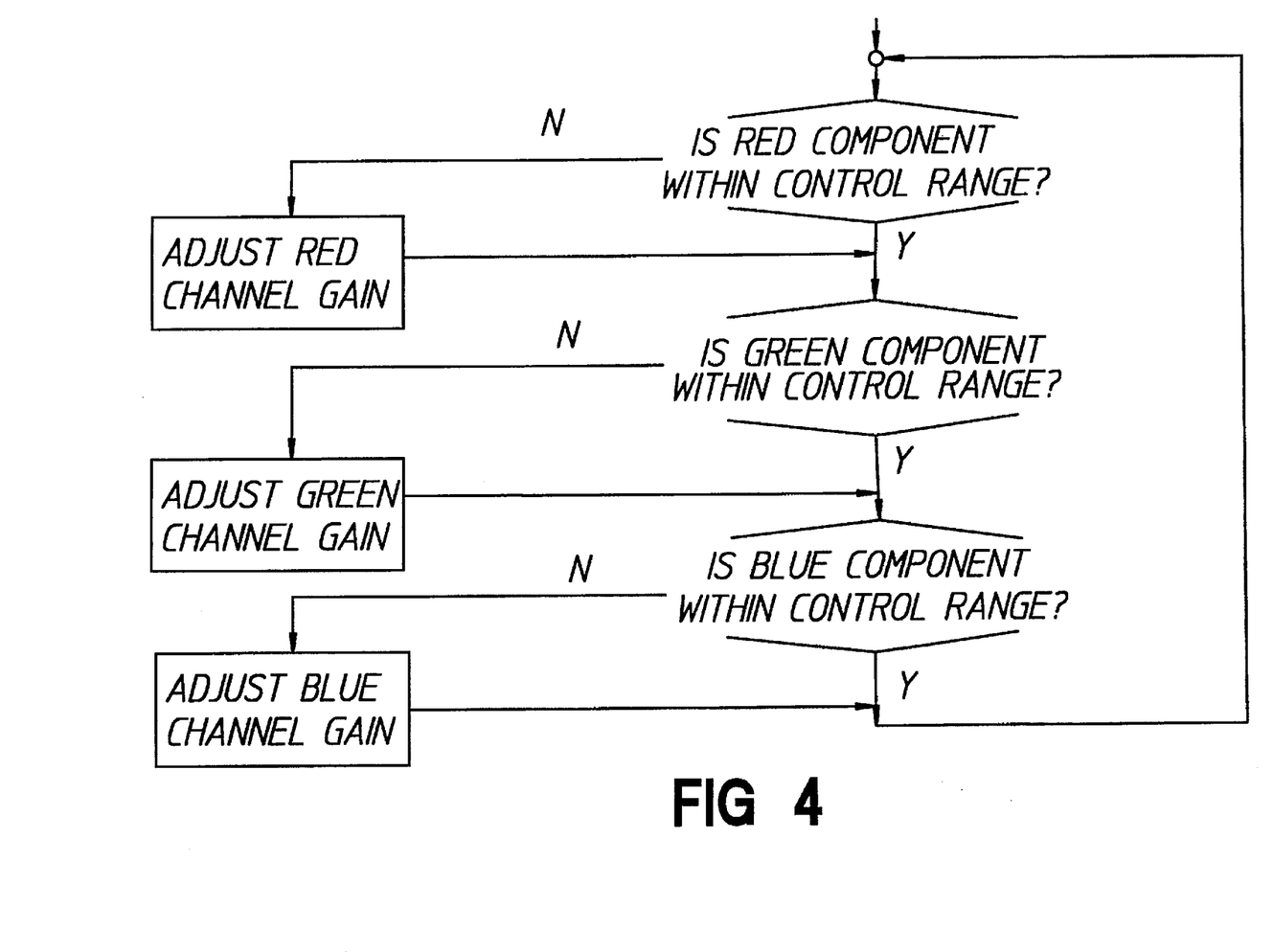
FIG. 4 shows a flow chart illustrating the method of the present invention.

FIG. 4 is a flow chart illustrating the method of the present invention. The microprocessor 302 continually monitors the red, green and blue components of the target white scan area 202. If the red component sensed by the sensor array 116 is not within a predetermined range, the controller 306 will adjust the red channel gain of the sensor array 116 by means of the red gain controller 312 so that the red component will be within the predetermined control range. If the red component is within the control range, nothing will be done to the red component and the microprocessor 302 will compare the green component to determine whether it is within a predetermined range. If the green component is not within the predetermined range, the controller 306 will adjust the green channel gain of the sensor array 116 by means of the green gain controller 310 so that the green component will be within the predetermined control range. If the green component is within the control range, nothing will be done to the green component and the microprocessor 302 will compare the blue component to determine whether it is within a predetermined range. If the blue component is not within the predetermined range, the controller 306 will adjust the blue channel gain of the sensor array 116 by means of the blue gain controller 308 so that the blue component will be within the predetermined control range.

In this manner, the color balance can be maintained within a predetermined range, even as the color balance of the light varies as the temperature of the light varies, by adjusting the various color component outputs of the sensor array 116 as a function of predetermined values for a white target.

Figure 5:
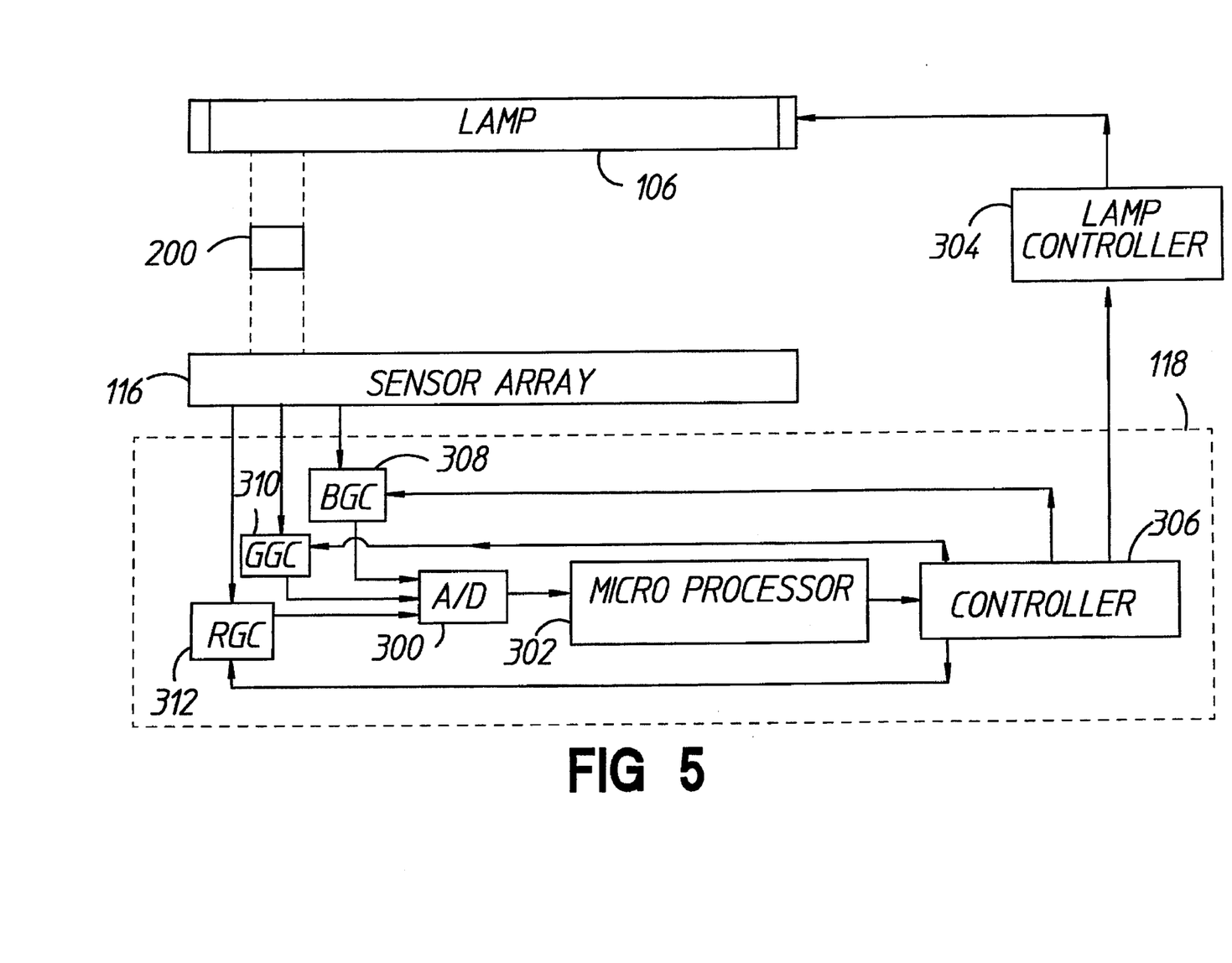
FIG. 5 shows a block diagram schematic of gain control circuitry of a preferred embodiment of the present invention.

FIG. 5 is a block diagram of the closed loop lamp color balance control circuitry according to a preferred embodiment of the present invention. In the preferred embodiment of FIG. 5, all of the gains (red, green and blue) and the lamp intensity are adjusted to a predetermined level initially before the start of the scan. This is accomplished by the sensor array 116 sensing the target which is a predetermined color, preferably a color towards the middle of the color spectrum, such as grey. The signal is then converted to a digital signal by the A/D converter 300. Next the microprocessor 302 compares the color balance of the three color channels with predetermined values and the light intensity of the lamp with a predetermined value. If the various color are high or low, the controller adjusts the gains of the respective color channels by means of gain controllers 308, 310 and 312. And if the light intensity is outside of a predetermined range, the controller 306 adjusts the power to the lamp 106 by means of a lamp controller 304, this is preferably accomplished by adjusting the current to the lamp 106. One method for controlling lamp light intensity is described in U.S. Pat. No. 5,336,976 of Webb et at., entitled Illumination Warm-up Control in a Document Scanner, which is incorporated herein for all that it teaches.

Figure 6:
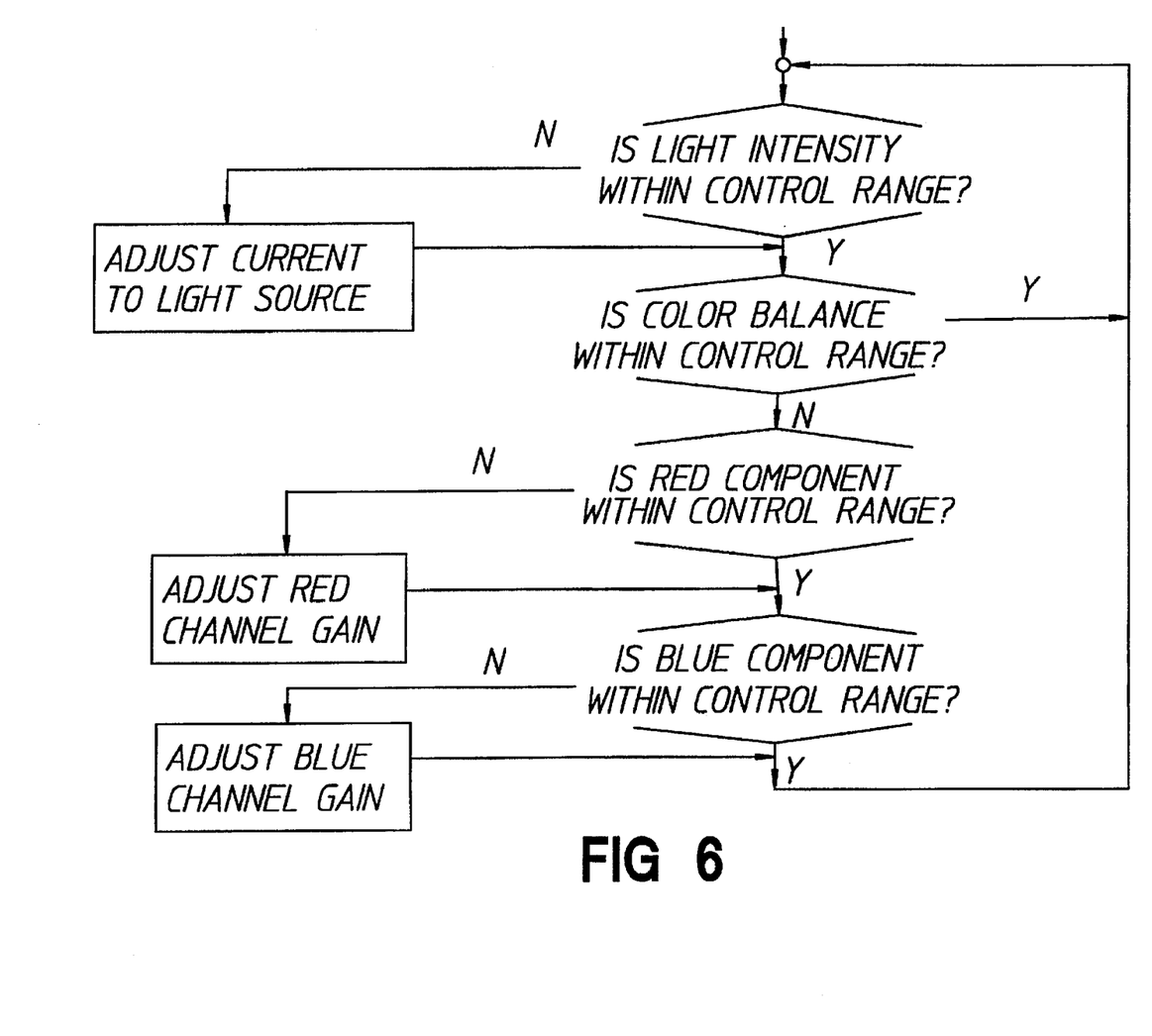
FIG. 6 shows a flow chart illustrating the method of the preferred embodiment of the present invention as shown in FIG. 5.

Once the scan has actually started, the color balance and the light intensity may be continually monitored and adjusted during the scan process, monitored and adjusted at predetermined intervals during the scan process, or monitored and adjusted whenever the scan stops. FIG. 6 is a flow chart illustrating an example of a preferred method of the present invention. Before the start of the scan, all of the gains and the intensity of the lamp are adjusted to be within predetermined ranges (not shown). Once the scan begins, one color channel gain is fixed, in this example, the green channel is held constant and used to monitor the light intensity of the lamp. If the light intensity is outside of a predetermined range, then the current to the lamp is adjusted in order to bring the light intensity within the predetermined range. Then all of the color channels are compared to determine whether the color balance between the three colors is within a predetermined range. If it is not, the gains of the two color channels that are not fixed are adjusted to bring the overall color balance within the predetermined range. In this example, the two color gains that are adjusted are the red channel gain and the blue channel gain. However, this is not necessary, any of the color gains could be held constant while the other two color gains are adjusted to maintain a relatively stable color balance. The process is then repeated at whatever time interval is chosen for system design and cost effectiveness.

The foregoing description of the present invention has been presented for purposes of illustration and description. It is not intended to be exhaustive or to limit the invention to the precise form disclosed, and other modifications and variations may be possible in light of the above teachings. For example, the target does not have to be a white target, but can be any color target. Shades of grey appear to be a good choice for the target as the intensities of the colors red, green and blue are closer together in the color grey, and therefore, the signal to noise ratio and quantization errors for the worst channel will be better with a grey target than with other colors that have more of one color than the other two. Also, more than three color channels may be monitored and adjusted to maintain color balance if more color balance precision is desired or if the scanner is a color scanner. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for maintaining a predetermined color balance in a document scanning device during a scanning process, the method comprising the following steps:
    (a) applying electrical power to a light source;
    (b) directing said light source toward a control target of a predetermined color;
    (c) monitoring a first color channel, a second color channel and a third color channel of a sensor army, said first color channel, said second color channel and said third color channel receiving light reflected by said control target;
    (d) comparing the color balance of said first color channel, said second color channel and said third color channel with a predetermined color balance; and
    (e) adjusting the gains of one or more of said first color channel, said second color channel and said third color channel, if the color balance of said first color channel, said second color channel and said third color channel is outside of a predetermined range when compared to said predetermined color balance.

2. The method of claim 1 wherein said light source is an electric-discharge light source.

3. The method of claim 2 wherein said sensor array is a CCD array.

4. The method of claim 1 wherein said control target is a white target.

5. The method of claim 1 wherein said control target is a grey target.

6. A method for maintaining a predetermined color balance and a predetermined light intensity in a document scanning device during a scanning process, the method comprising the following steps:
    (a) applying electrical power to a light source;
    (b) directing said light source toward a control target of a predetermined color;
    (c) monitoring a first color channel of a sensor array, said first color channel of said sensor array receiving light reflected by said control target;

(d) comparing the light intensity of said first color channel with a predetermined light intensity;

(e) adjusting the electrical power to said light source, if the compared light intensity is outside of a predetermined range with respect to said predetermined light intensity;

(f) monitoring said first color channel, a second color channel and a third color channel of a sensor array, said first color channel, said second color channel and said third color channel receiving light reflected by said control target;

(g) comparing the color balance of said first color channel, said second color channel and said third color channel with a predetermined color balance; and (h) adjusting the gains of one or both of said second color channel and said third color channel, if the color balance of said first color channel, said second color channel and said third color channel is outside of a predetermined range when compared to said predetermined color balance.

7. The method of claim 6 wherein said light source is an electric-discharge light source.

8. The method of claim 7 wherein step (e) comprises adjusting the current to said electric-discharge light source.

9. The method of claim 8 wherein said sensor array is a CCD array.

10. The method of claim 6 wherein said control target is a white target.

11. The method of claim 6 wherein said control target is a grey target.

* * * * *

UNITED STATES PATENT AND TRADEMARK OFFICE
CERTIFICATE OF CORRECTION

PATENT NO. : 5,654,809
DATED : August 5, 1997
INVENTOR(S) : Edward S. Beeman, et al It is certified that error appears in the above-indentified patent and that said Letters Patent is hereby corrected as shown below:

Column 2, line 41, "*dosed*" should read -- *closed* --;

line 47, "*dosed*" should read -- *closed* --; and line 60, "*army*" should read -- *array* --.

Claim 1, Column 4, line 36, "*army*" should read -- *array* --.

Signed and Sealed this

Twelfth Day of October, 1999

Attest:

Q. TODD DICKINSON

*Attesting Officer*   *Acting Commissioner of Patents and Trademarks*